(12) United States Patent
Caracino et al.

(10) Patent No.: US 6,794,579 B1
(45) Date of Patent: Sep. 21, 2004

(54) HIGH TEMPERATURE SUPERCONDUCTING CABLE

(75) Inventors: Paola Caracino, Milan (IT); Laura Gherardi, Monza (IT); Piero Metra, Varese (IT); Marco Nassi, Turin (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 09/498,062

(22) Filed: Feb. 4, 2000

Related U.S. Application Data

(63) Continuation of application No. PCT/EP98/04991, filed on Jul. 28, 1998.
(60) Provisional application No. 60/059,986, filed on Sep. 25, 1997.

(30) Foreign Application Priority Data

Aug. 5, 1997 (EP) .............................................. 97202433

(51) Int. Cl.$^7$ ................................................ H01B 12/00
(52) U.S. Cl. ..................... 174/125.1; 505/230; 505/430
(58) Field of Search ............................ 174/125.1, 15.5, 174/15.4; 505/230–232, 430–432; 565/887, 886, 885, 884, 704

(56) References Cited

U.S. PATENT DOCUMENTS

| | | | | |
|---|---|---|---|---|
| 3,643,002 A | * | 2/1972 | Minnich ....................... 174/15 |
| 3,730,966 A | * | 5/1973 | Aupoix et al. ............. 174/15 C |
| 4,417,093 A | * | 11/1983 | Occhini et al. ............ 174/25 R |
| 4,549,156 A | * | 10/1985 | Mine et al. .................. 335/216 |
| 5,932,523 A | * | 8/1999 | Fujikami et al. ............ 505/231 |
| 6,255,595 B1 | * | 7/2001 | Metra et al. .............. 174/125.1 |
| 6,262,375 B1 | * | 7/2001 | Engelhardt et al. ...... 174/125.1 |

FOREIGN PATENT DOCUMENTS

| | | |
|---|---|---|
| DE | 38 11 050 | 10/1989 |
| EP | 0 627 773 | 12/1994 |
| EP | 0 743 658 | 11/1996 |
| EP | 0 747 975 | 12/1996 |
| EP | 0 786 783 | 7/1997 |

OTHER PUBLICATIONS

T. Hara et al., "Feasibility Study of Compact High–Tc Superconducting Cables", IEEE Transactions on Power Delivery, vol. 7, No. 4, pp. 1745–1753, (1992).

\* cited by examiner

*Primary Examiner*—Evan Pert
*Assistant Examiner*—Jeremy Norris
(74) *Attorney, Agent, or Firm*—Finnegan, Henderson, Farabow, Garrett & Dunner, L.L.P.

(57) ABSTRACT

A high temperature superconducting cable includes a tubular support and a plurality of superconducting tapes. The superconducting tapes include a superconducting material enclosed in a metal covering, spirally wound onto the tubular support to form at least an electroinsulated, thermally-insulated, and refrigerated superconducting layer. The superconducting tapes also include at least a metal strip coupled to the metal covering. A process for manufacturing high temperature superconducting cables is also disclosed.

16 Claims, 4 Drawing Sheets

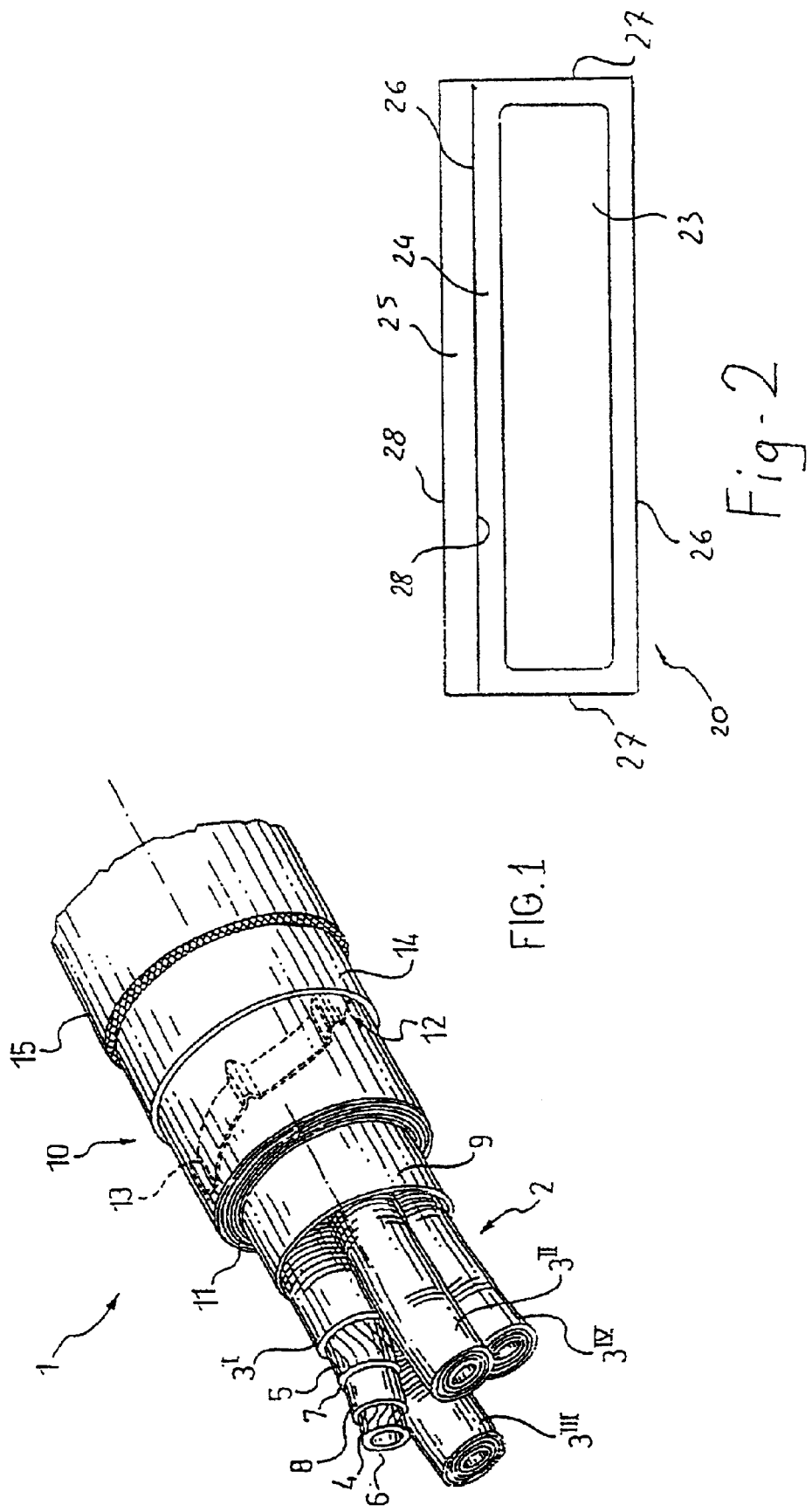

HIGH TEMPERATURE SUPERCONDUCTING CABLE

CROSS-REFERENCE TO RELATED APPLICATIONS

This application is a continuation of International Application No. PCT/EP98/04991, filed Jul. 28, 1998, in the European Patent Office, the content of which is relied upon and incorporated herein by reference; additionally, Applicants claim the right of priority under 35 U.S.C. §119(a)–(d) based on patent application No. 97202433.5, filed Aug. 5, 1997, in the European Patent Office; further, Applicants claim the benefit under 35 U.S.C. §119(e) based on prior-filed, copending provisional application No. 60/059,986, filed Sep. 25, 1997, in the U.S. Patent and Trademark Office.

BACKGROUND OF THE INVENTION

1. Field of the Invention

The present invention relates to a superconducting cable of the so-called high temperature type, and a manufacturing process for the same.

2. Description of the Related Art

The term superconducting material, as employed throughout the description and the appended claims, refers to any material, such as for instance ceramic materials based on mixed oxides of copper, barium and yttrium or of bismuth, lead, strontium, calcium, copper, thallium and mercury, comprising a superconducting stage having an almost null resistivity at temperatures below a so-called critical temperature Tc.

In the field of superconductors and, accordingly, in the present description, the term high temperature refers to any temperature near to or higher than the temperature of liquid nitrogen (about 77° K), compared to the temperature of liquid helium (about 4° K), usually indicated as low temperature.

High temperature superconducting cables are known for instance from DE-A-3811050 and EP-A-0747975.

Superconducting materials are known that have a critical temperature higher than 77° K, i.e. that show superconductivity characteristics at least up to such temperature. These materials are usually referred to as high temperature superconductors. Such materials are obviously of a greater technical interest with respect to low temperature superconductors, as their working may be ensured by liquid nitrogen refrigeration at 77° K instead of liquid helium at 4° K, with much lower implementation difficulties and energy costs.

As known, in the field of electric energy transportation, one of the problems of most difficult solution is that of rendering more and more advantageous the use of the so-called superconducting materials, from both the technological and the economic points of view.

In fact, even though these low temperature materials have been known for a long time, their diffusion was limited till now to some well defined practical applications, such as for instance the fabrication of magnets for NMR apparatuses or high field magnets for which cost is not a discriminating factor.

Actually, cost savings due to less power being dissipated by superconductors is still more than counterweighted by costs due to liquid helium refrigeration, necessary to keep the latter below its critical temperature.

In order to solve the aforesaid problem, research is partly oriented towards experimenting new high temperature superconducting materials, partly tries to constantly improve both the characteristics of the existing materials and the performances of conductors incorporating already available materials.

With regard to geometric characteristics, it has been found that an advantageous geometry is provided by thin tapes having, generally, a thickness between 0.05 mm and 1 mm.

In fact, in such case the conductor comprising the very brittle superconducting ceramic material achieves on one hand an improved resistance to various bending stresses to which it is submitted during each manufacturing, shipping and installing operations of the cable containing it, and on the other hand it provides better performances with regard to critical current density, because of the more advantageous orientation and compacting degree of the superconducting material.

For various reasons and in particular to improve mechanical resistance, the above conductors generally comprise a plurality of tapes, formed each by a core of superconducting material enclosed in a metal envelope—generally of silver or silver alloys—coupled together to obtain a multi-filament composite structure.

According to a widely used method, known to those skilled in the art as "powder-in-tube", this multi-filament structure of the conductor is obtained starting from small metal tubes filled with a suitable powder precursor, said tubes being in their turn enclosed in another external metal tube or a billet, so as to obtain a compact bundle of tubes which are submitted first to several subsequent permanent deformation, extrusion and/or drawing treatments, then to rolling mill and/or pressing treatments, until the desired tape-shaped structure is obtained. See for instance EP-A-0627773.

Between a rolling mill treatment and the subsequent one, the tape being worked is submitted to one or more heat treatments to cause formation of the superconducting ceramic material starting from its precursor and, above all, its syntherisation, i.e. the mutual "welding" of the granules of the powdered superconductor.

The tapes of high temperature superconductors are rather brittle, both at the working temperature of 77° K and at room temperature, and are unsuited to stand mechanical stresses, especially tensile stresses. In fact, apart from an actual mechanical breaking, exceeding a given tensile deformation threshold irreversibly jeopardises the superconduction characteristics of the material. Therefore, using these materials in cables is particularly complex and delicate.

In fact, the manufacturing and installation of cables comprising such materials involves several stages which bring about unavoidably mechanical stresses.

A first critical stage is winding of several tapes on a flexible tubular support according to a spiral arrangement, until the desired section of superconducting material is obtained. Both winding and pull cause tensile, bending and torsion deformations in tapes. The resulting stress applied to the superconducting material is mainly a tensile stress. Besides, the so formed conductor (support plus superconducting material) is surrounded by heat and electric insulation means, and is submitted, during these operations, to tractions and bendings that introduce more stresses in superconducting tapes.

A second critical stage concerns cable installation. The cable is installed at room temperature, which causes additional tensile and bending stresses. Mechanical connections (i.e., locking of cable heads), electric connections, and hydraulic connections (i.e., for liquid nitrogen) are carried out at room temperature. After completing installation, the cable is brought to its working temperature by feeding liquid nitrogen. During such cooling, each cable component is subject to mechanical stresses of thermal origin, differing according to the thermal expansion coefficient of the constituting material and of the characteristics of the other elements.

In particular, the differences of expansion coefficients between the support and the superconducting tape may cause stresses in the latter and therefore in the superconducting material. In fact, if the superconducting material cannot shrink freely being tied to a less shrinkable support, tensile strains generate in the superconducting material. Such tensile strains add to those already present, due to winding.

To reduce tensile strains, the use of supports has been suggested that are made of a material having an expansion coefficient higher than that of the superconducting material (usually equal to $10 \times 10^{-6}/K - 20 \times 10^{-6}/K$), i.e., on the order of at least $75 \times 10^{-6}/K$. Such material would not be a metal, as no known metal has such values, but only a polymeric material such as, for instance, Teflon®, polyethylene, and derivatives thereof.

However, it has been found that the aforesaid solution, whose aim is to reduce thermomechanical stresses on tapes through a suitable reduction in the support diameter, shows some important drawbacks.

In particular, the unavoidably high values of heat contraction of the conductor (support plus superconducting material) cause the formation of a wide radial hollow space between the conductor itself and the surrounding insulating means (thermal and/or electric insulation). This hollow space may cause electric inconveniences, with deformation or breaking of the insulation, and/or mechanical inconveniences, namely lack of cohesion, misalignment and slipping of the conductor.

Besides, poor mechanical characteristics of said polymer material do not allow to protect the superconducting material adequately during cable manufacturing and installation phases: because of the high deformability of these materials any strain applied to conductors causes indeed a remarkable deformation also in the superconducting material.

SUMMARY OF THE INVENTION

Therefore, the invention relates, in a first aspect, to a high temperature superconducting cable, comprising a tubular support, a plurality of superconducting tapes including a superconducting material enveloped in a metal covering (for instance, silver or a silver-based alloy with magnesium and/or aluminium and/or nickel), said tapes being spirally wound on the support, so as to form an electroinsulated, thermally-insulated and refrigerated superconducting layer, characterised in that the superconducting tapes have a maximum tensile deformation greater than 3‰.

The above value is to be intended as referred to the manufacturing and installation process described above, i.e.: winding and installation at room temperature, then cooling to working temperature of about 77° K. The same applies also to the deformation values that will be given in the following.

Preferably, the superconductive tapes comprise at least a metal strip (or band or laminate) connected to the metal covering.

In this way, the capability of bearing tensile stresses increases. It has been observed that tensile deformation safely bearable by superconducting materials may be—at best—about 3‰. This figure takes into account the fact that the superconducting materials already bear a compression deformation of about 1‰–1.5‰ because of the different thermal contraction of the superconducting material relative to the metal covering during the tape fabrication stage.

Thanks to the metal strip of the invention, not only a lower deformation under the same applied strains has been observed, but especially an improved tensile deformation resistance; elongation values equal to about 5.5‰ have been actually reached without any damage. This effect is thought to be due to a more uniform distribution of strains in the superconducting material, that allows to better exploit the mechanical characteristics of said superconducting material.

According to each individual case, only one strip coupled to the metal covering, or two strips, located at the opposite sides of the tape, can be provided.

Preferably, the metal strip is coupled to the metal covering by welding, brazing or gluing.

Preferably, the strip is made of non magnetic stainless steel having a low electric conductivity, or also of bronze or aluminium.

Preferably, the tubular support of the cable is made of metal. The greater capability of bearing tensile stresses allows indeed to use a support made of metal instead of polymeric material, as will be better explained in the following.

Various types of metals may be used for the support; in particular, for applications with very high currents, non-magnetic steel is used, preferably stainless steel. Alternatively, copper or aluminium may also be used.

The structure of the tubular support may be continuous, either smooth or corrugated. Alternatively, the tubular support may have a structure formed by a spirally wound metal tape, or may have a so-called tile-structure, i.e. with spirally connected adjacent sectors.

In a second aspect, the invention relates to a process for manufacturing high temperature superconducting cables, comprising the steps of:

providing a tubular support, enclosing a superconductive material in a metal covering, so as to form superconductive tapes, spirally winding a plurality of superconducting tapes onto the support so as to form at least a superconducting layer, electroinsulating the superconductive layer, thermally insulating the superconductive layer, providing the possibility of refrigerating the superconductive layer below a predetermined working temperature, when cables are in use, characterised by controlling the maximum tensile deformation of the superconducting tapes to have it greater than 3‰.

This process allows to manufacture cables according to the first aspect of the invention.

BRIEF DESCRIPTION OF THE DRAWINGS

Further characteristics and advantages of a cable and a process according to the invention will appear more clearly from the following description of a preferred embodiment, wherein reference is made to the attached drawings. In the drawings:

FIG. 1 is a schematic view of a high-temperature, superconducting cable according to the invention, with portions cut away for viewing clarity;

FIG. 2 is a cross-sectional, schematic view of a high-temperature, superconducting tape with a metal strip, band, or laminate utilised in the cable of FIG. 1;

DETAILED DESCRIPTION OF THE PREFERRED EMBODIMENTS

Figure 3:
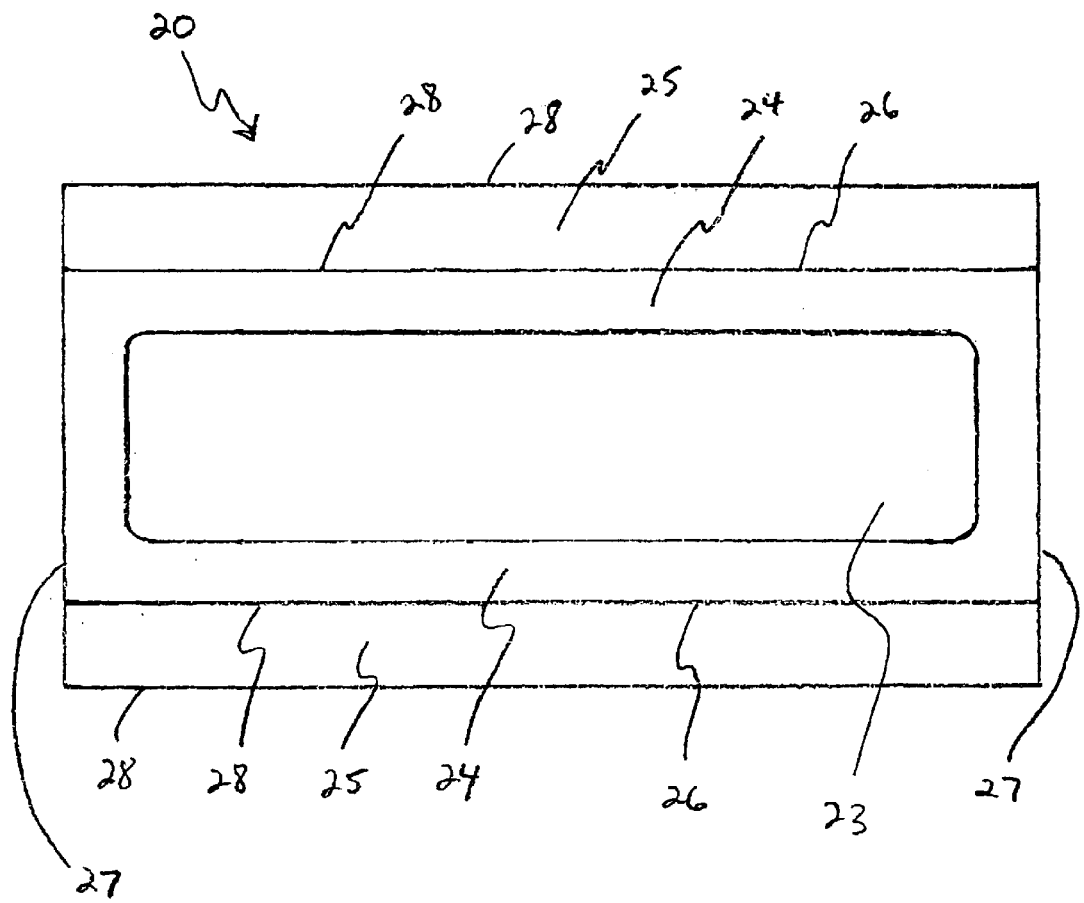
FIG. 3 is a cross-sectional, schematic view of a high-temperature, superconducting tape with two metal strips, bands, laminates, or combinations thereof, utilised in the cable of FIG. 1.
Figure 4A:
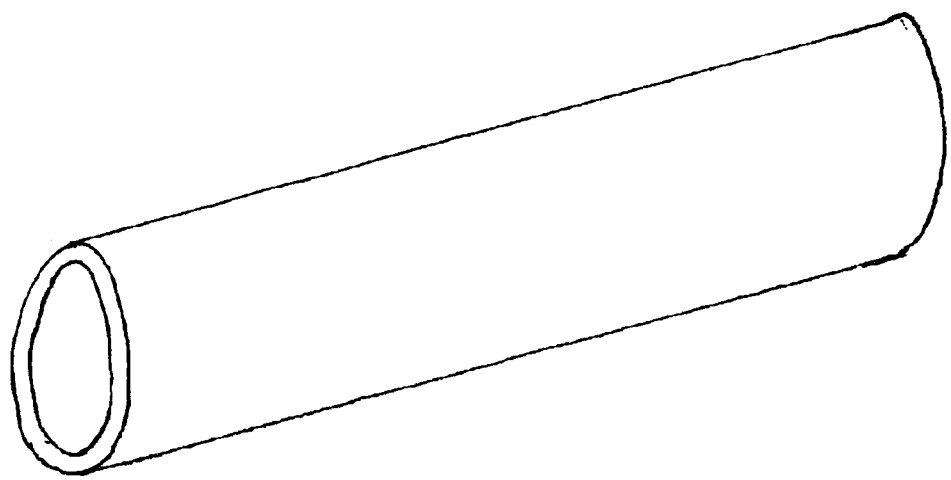
FIG. 4a is a perspective view of a tubular support with one type of smooth structure.
Figure 4B:
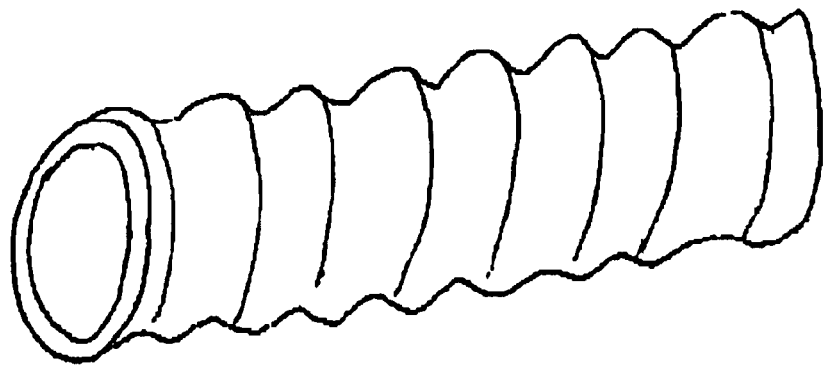
FIG. 4b is a perspective view of a tubular support with one type of corrugated structure.
Figure 4C:
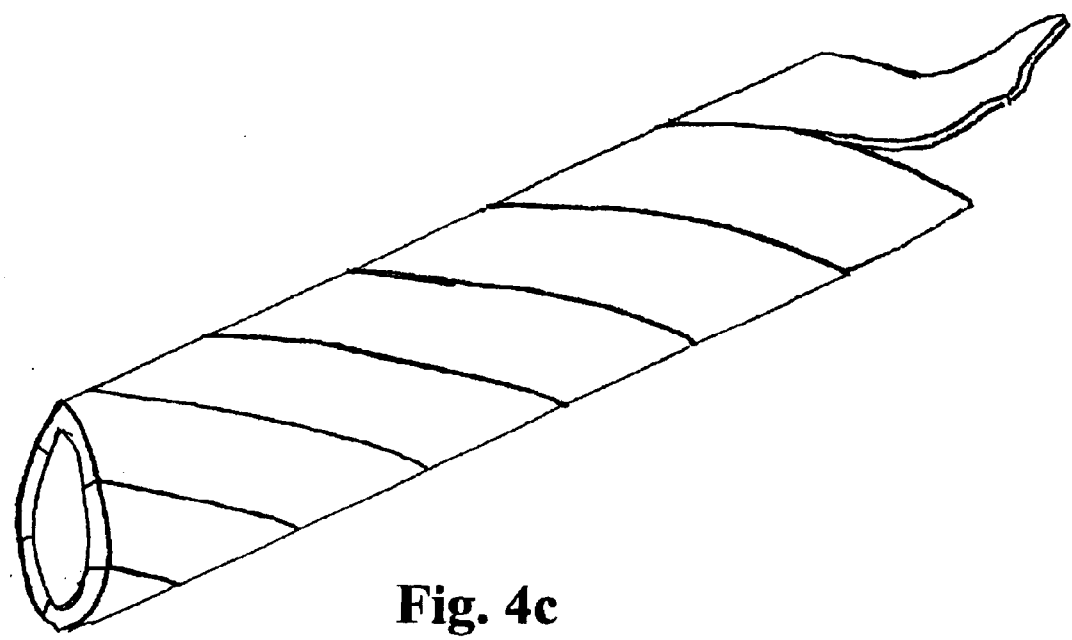
FIG. 4c is a perspective view of a tubular support with one type of spirally-wound structure, shown partially unwound.
Figure 4D:
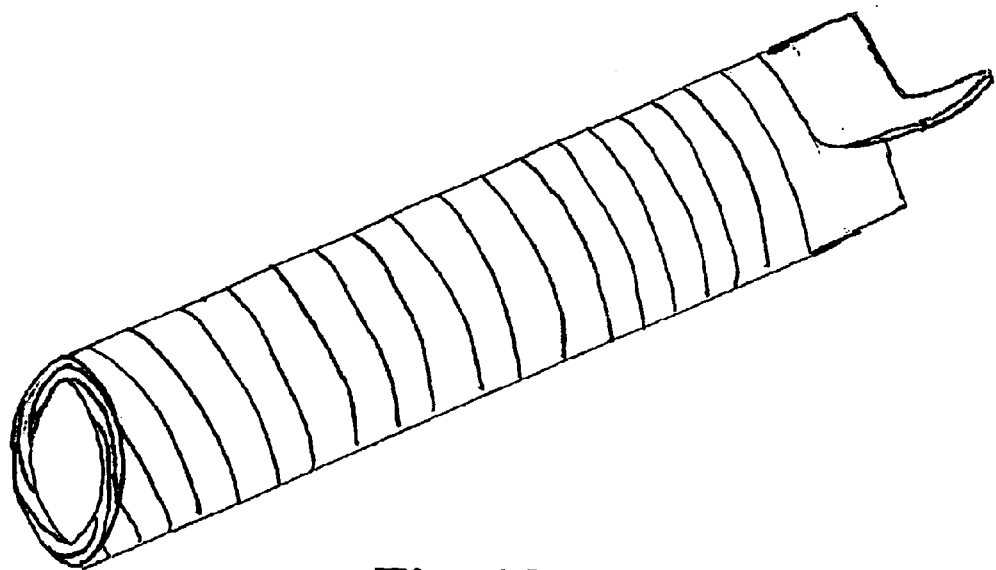
FIG. 4d is a perspective view of a tubular support with one type of tile structure, shown partially unwound.

With reference to FIG. 1, 1 indicates a one-phase superconducting cable 1 of the so-called co-axial type as a whole. Cable 1 comprises a superconducting core, globally indicated by 2, comprising at least a conducing element 3; the illustrated example relates (according to the European patent application no. 96203551.5 of the same applicant) to a cable wherein four conducting elements are provided, indicated by $3^I$, $3^{II}$, $3^{III}$, $3^{IV}$, housed—preferably loosely—within a tubular casing 9, for instance of metal, such as steel, aluminium and the like.

Each of the conducting elements 3 comprises a couple of co-axial conductors, respectively of phase 4 and of neutral 5, including each at least a layer of superconducting material.

In said example, the superconducting material is incorporated in a plurality of superposed superconducting tapes 20, spirally wound on respective tubular supports 6 and (possibly) 7, with a sufficiently low winding angle α; if the tubular support is metal, the angle α is preferably smaller than 40°, as will be illustrated in the following.

Co-axial phase 4 and neutral 5 conductors are electrically insulated from one another by means of an interposed layer 8 of dielectric material.

Cable 1 also comprises suitable means to refrigerate the superconducting core 3 to a temperature suitably lower than the critical temperature of the chosen superconducting material, which in the cable of FIG. 1 is of the so-called "high temperature" type.

The aforesaid means comprise suitable, known and thus not represented, pumping means, whose purpose is feeding a suitable refrigerating fluid, for instance liquid nitrogen at a temperature of from 65° to 90° K, both in the interior of each of the conducting elements 3, and in the interstices between such elements and the tubular casing 9.

To reduce as much as possible thermal dispersions toward environment, the superconducting core 2 is enclosed in a holding structure, or cryostat, 10 comprising a thermal insulation formed, for instance, by a plurality of superposed layers, and at least a protection sheath.

A cryostat, known in the art, is described for instance in an article by IEEE TRANSACTIONS ON POWER DELIVERY, vol. 7, no. 4, October 1992, pp. 1745–1753.

More particularly, in said example, cryostat 10 comprises a layer 11 of insulating material, constituted for instance by several tapes (some dozens) from surface-metallised plastic material (for instance polyester resin), known in the art as "thermal superinsulator", loosely wound, possibly with the aid of interposed spacers 13.

Such tapes are housed in an annular hollow space 12, delimited by a tubular element 14, in which vacuum of about $10^{-2} N/m^2$ is maintained by means of known apparatuses.

The metal tubular element 14 is suitable to give the annular hollow space 12 the desired impermeability, and is covered by an external sheath 15, for instance of polyethylene.

Preferably, the metal tubular element 14 is formed by a tape wound in tubular shape and longitudinally welded, made of steel, copper, aluminium and the like, or by an extruded tube or the like.

If required for cable flexibility, element 14 may be corrugated.

In addition to the described elements, cable traction elements may also be present, axially or peripherally located based on the construction and use requirements of the same, to ensure limitation of mechanical stresses applied to superconducting elements 3. Such traction elements, not shown, may be constituted, according to techniques known in the art, by peripherally-placed metal armours, for instance, by roped steel wires, or by one or more axial metal cords, or by armouring fibers of dielectric material, for instance, aramid fibers.

Preferably, the tubular supports 6 and 7 are made of non magnetic stainless steel, and may have a continuous, either smooth or corrugated, structure; alternatively, tubular supports 6 and 7 may be realised with a spirally wound steel strip or with a tile structure. Materials different from steel may also be used, such as copper or aluminium.

Each superconducting tape 20, as shown in FIG. 2, comprises superconducting material 23, a metal covering 24 (preferably from silver or silver alloy with magnesium, aluminium or nickel), wherein the superconducting material 23 is enclosed, and at least a metal strip (or band or laminate) 25 coupled to covering 24. In particular, covering 24 has a substantially rectangular flattened section with two long sides 26 and two short sides 27; also strip 25 has a substantially rectangular flattened section with two long sides 28 of a length almost equal to the long sides 26 of covering 24. Strip 25 is fastened to covering 24 by welding, brazing or gluing. It should be noted that there may be two strips 25, either equal or different, fastened to opposite parts of covering 24.

EXAMPLE

To put into practice the invention, some cables have been realised having the following characteristics:

support:
　metal or polymer
winding diameter (external diameter of the support):
　40 mm
angle α:
　10–45°
thickness of superconducting tape:
　0.2 mm
width of superconducting tape:
　4 mm
pull on individual tapes during winding:
　10 N
working temperature:
　77° K
refrigeration with locked heads (temperature jump equal to 220° K)

heat expansion coefficient of superconducting tape: $18.5 \times 10^{-6 \circ}$ C.

heat expansion coefficient of polymer support: $80 \times 10^{-6 \circ}$ C.

heat expansion coefficient of metal support: $15 \times 10^{-6 \circ}$ C.

The deformation effects on the superconducting material have been taken into account, both those due to winding geometry (which depend on bending imparted to the tape and which therefore increase as angle α increases), and those due to pull during winding operation (constant), and those with locked cable heads due to the effect of thermal variation (which decrease as angle α increases, until they may become negative with a sufficiently great α). In the tables, positive figures have been used to indicate pulling deformations, negative figures to indicate compression deformations.

The tables show the feasibility of both a conventional superconducting tape, with a maximum bearable tensile deformation equal to 3‰, and a superconducting tape according to the invention (provided with two strips 25 located along sides 26 of the section, having a thickness of 0.045 mm and a length of 3.8 mm, made of stainless steel, and bonded to covering 24 of the strip by tin brazing), with a maximum bearable tensile deformation equal to 5.5‰ (a 2.5‰ improvement). In the latter case, the minimum increase value of tensile deformation resistance necessary to ensure feasibility has been indicated, assuming (as indicated above and practically verified) that the superconducting non-reinforced tape can bear a 3‰ tensile deformation.

The possibility of using a metal for the support is particularly advantageous, as such support, besides imparting a greater solidity to the cable, therefore with a better protection for the superconducting material, above all allows to prevent those drawbacks of polymeric supports mentioned above for the prior art; this means that no dangerous hollow spaces form at the working temperature between the conductor and the surrounding layers, due to differences in heat expansion coefficient. Because in the cable the layers external with respect to the conductor are—as has been seen—prevailingly metal, using a metal support minimises expansion differences and therefore drastically reduces inconveniences due to hollow spaces.

Besides, the metal support lends a greater mechanical resistance to the conductor, understood as the whole of the support and the superconducting material wound on the same. Hence, possible mechanical stresses on the conductor are not transmitted to a great extent to superconducting tapes (as happens with polymer supports because of their high deformability), but are instead almost entirely borne by the same support.

Also the possibility of increasing the winding pull of the superconducting material is a very important advantage. In fact, compactness of the conductor winding, and therefore its stability, depends on said pull.

To sum up, the invention allows to realise less delicate and more resistant superconducting cables.

| Winding angle ° | Geometric winding deformation ‰ | Pull deformation ‰ | Thermal deformation ‰ | Total deformation ‰ | Feasibility by a conventional superconducting tape | Minimum necessary improvement ‰ | Feasibility by an improved superconducting tape |
|---|---|---|---|---|---|---|---|
| 10 | 0.3 | 0.25 | 3.5 | 4.05 | NO | 1.05 | YES |
| 25 | 1.4 | 0.25 | 0.93 | 2.58 | YES | — | YES |
| 28.7 | 1.75 | 0.25 | 0 | 2 | YES | — | YES |
| 45 | 3.4 | 0.25 | −4 | (−0.35)[1] | NO | 0.4 | YES |

Double-underlined values indicate that the 3‰ limit has been exceeded.

Table 1 summarises the situation in the case of a polymeric support, table 2 that relating to the case of a metal support.

For a conventional superconducting tape, the mere geometric deformation at room temperature is sufficient to irreversibly damage the tape itself. Therefore, the −0.35 value is significant only for the improved superconducting tape.

| Winding angle ° | Geometric winding deformation ‰ | Pull deformation ‰ | Thermal deformation ‰ | Total deformation ‰ | Feasibility by a conventional superconducting tape | Minimum necessary improvement ‰ | Feasibility by an improved superconducting tape |
|---|---|---|---|---|---|---|---|
| 10 | 0.3 | 0.25 | 4 | 4.55 | NO | 1.55 | YES |
| 25 | 1.4 | 0.25 | 3.5 | 5.15 | NO | 2.15 | YES |
| 28.7 | 1.75 | 0.25 | 3.3 | 5.3 | NO | 2.3 | YES |
| 45 | 3.4 | 0.25 | 2.42 | 6.07 | NO | 3.07 | NO |

The example shows, in a specific case, that generally the invention allows a greater design freedom as concerns winding angles, support diameter, winding pull value, and, to some extent, choice of material for the support.

What is claimed is:

1. A high temperature superconducting cable comprising:
   a tubular support; and
   a plurality of superconducting tapes;

wherein the plurality of superconducting tapes are spirally wound onto the tubular support to form at least an electroinsulated, thermally-insulated, and refrigeratable superconducting layer, wherein the superconducting tapes include a superconducting material enclosed in a metal covering, wherein the superconducting tapes comprise at least one metal strip coupled to the metal covering, and wherein the superconducting tapes have a maximum bearable tensile deformation greater than 3‰ during manufacture and installation.

2. The cable of claim 1, wherein the metal covering comprises silver or a silver-based alloy with magnesium, aluminum, nickel, or mixtures thereof.

3. The cable of claim 1, wherein the at least one metal strip is coupled to the metal covering by welding.

4. The cable of claim 1, wherein the at least one metal strip is coupled to the metal covering by brazing.

5. The cable of claim 1, wherein the at least one metal strip is coupled to the metal covering by gluing.

6. The cable of claim 1, wherein the tubular support is made of metal.

7. The cable of claim 1, wherein the tubular support is made of non-magnetic stainless steel.

8. The cable of claim 1, wherein the tubular support is made of copper.

9. The cable of claim 1, wherein the tubular support has a continuous structure, either smooth or corrugated.

10. The cable of claim 1, wherein the tubular support has a spirally-wound metal strip structure.

11. The cable of claim 1, wherein the tubular support has a tile structure.

12. The cable of claim 1, wherein a winding angle of the superconducting tapes onto the tubular support is smaller than 40°.

13. A high temperature superconducting cable, comprising:

a tubular support; and a plurality of superconducting tapes;

wherein the plurality of superconducting tapes are spirally wound onto the tubular support to form at least an electroinsulated, thermally-insulated, and refrigeratable superconducting layer, wherein the superconducting tapes include a superconducting material enclosed in a metal covering, wherein the superconducting tapes comprise at least one metal strip coupled to the metal covering, and wherein the superconducting tapes comprise two metal strips coupled to the metal covering.

14. A high temperature superconducting cable, comprising:

a tubular support; and a plurality of superconducting tapes;

wherein the plurality of superconducting tapes are spirally wound onto the tubular support to form at least an electroinsulated, thermally-insulated, and refrigeratable superconducting layer, wherein the superconducting tapes include a superconducting material enclosed in a metal covering, wherein the superconducting tapes comprise at least one metal strip coupled to the metal covering, and wherein the at least one metal strip is made of non-magnetic stainless steel having a low electric conductivity.

15. A high temperature superconducting cable, comprising:

a tubular support; and a plurality of superconducting tapes;

wherein the plurality of superconducting tapes are spirally wound onto the tubular support to form at least an electroinsulated, thermally-insulated, and refrigeratable superconducting layer, wherein the superconducting tapes include a superconducting material enclosed in a metal covering, wherein the superconducting tapes comprise at least one metal strip coupled to the metal covering, and wherein the at least one metal strip is made of bronze.

16. A high temperature superconducting cable, comprising:

a tubular support; and a plurality of superconducting tapes;

wherein the plurality of superconducting tapes are spirally wound onto the tubular support to form at least an electroinsulated, thermally-insulated, and refrigeratable superconducting layer, wherein the superconducting tapes include a superconducting material enclosed in a metal covering, wherein the superconducting tapes comprise at least one metal strip coupled to the metal covering, and wherein the at least one metal strip is made of aluminum.

\* \* \* \* \*